United States Patent [19]

Miller et al.

[11] 4,080,424

[45] Mar. 21, 1978

[54] PROCESS FOR ACID GAS REMOVAL FROM GASEOUS MIXTURES

[75] Inventors: Loren N. Miller, Ho Ho Kus, N.J.; Robert A. Macriss, Deerfield; Thomas S. Zawacki, Oak Park, both of Ill.

[73] Assignee: Institute of Gas Technology, Chicago, Ill.

[21] Appl. No.: 657,038

[22] Filed: Feb. 11, 1976

[51] Int. Cl.$^2$ ............................................ B01D 53/34
[52] U.S. Cl. ................................... 423/223; 423/224; 423/226; 423/232; 423/234; 55/68; 55/73
[58] Field of Search ................................... 55/68, 73; 423/226–229, 232, 220, 573, 233, 224, 234, 223

[56] References Cited

U.S. PATENT DOCUMENTS

| 1,533,773 | 4/1925 | Sperr, Jr. et al. ............... 423/232 |
| 3,035,889 | 5/1962 | Nicklin et al. ............... 423/573 X |
| 3,754,376 | 8/1973 | Kent ............................... 55/73 X |
| 3,773,896 | 11/1973 | Preusser ............................ 423/226 |
| 3,880,615 | 4/1975 | Grunewald et al. ........... 55/68 X |

*Primary Examiner*—Earl C. Thomas
*Attorney, Agent, or Firm*—Thomas W. Speckman

[57] ABSTRACT

A hybrid physical-chemical absorbent process using the interrelation between a physical solvent and a $H_2S$ selective chemical solvent for removal of $CO_2$ and sulfur containing compounds, principally $H_2S$ from a mixed gas stream. This process is especially useful in processes such as coal gasification where the incoming stream to the acid gas removal process is at about 1100 psia, 70° F., contains about 15 to 40 mole percent $CO_2$ at a mole ratio of $CO_2/H_2S$ of about 25 to 50. In such cases the product stream contains less than 1 ppm sulfur and less than 3 mole percent $CO_2$ which is suitable for production of substitute natural gas while the $CO_2$ atmospheric effluent contains less than 7 ppm sulfur.

11 Claims, 1 Drawing Figure

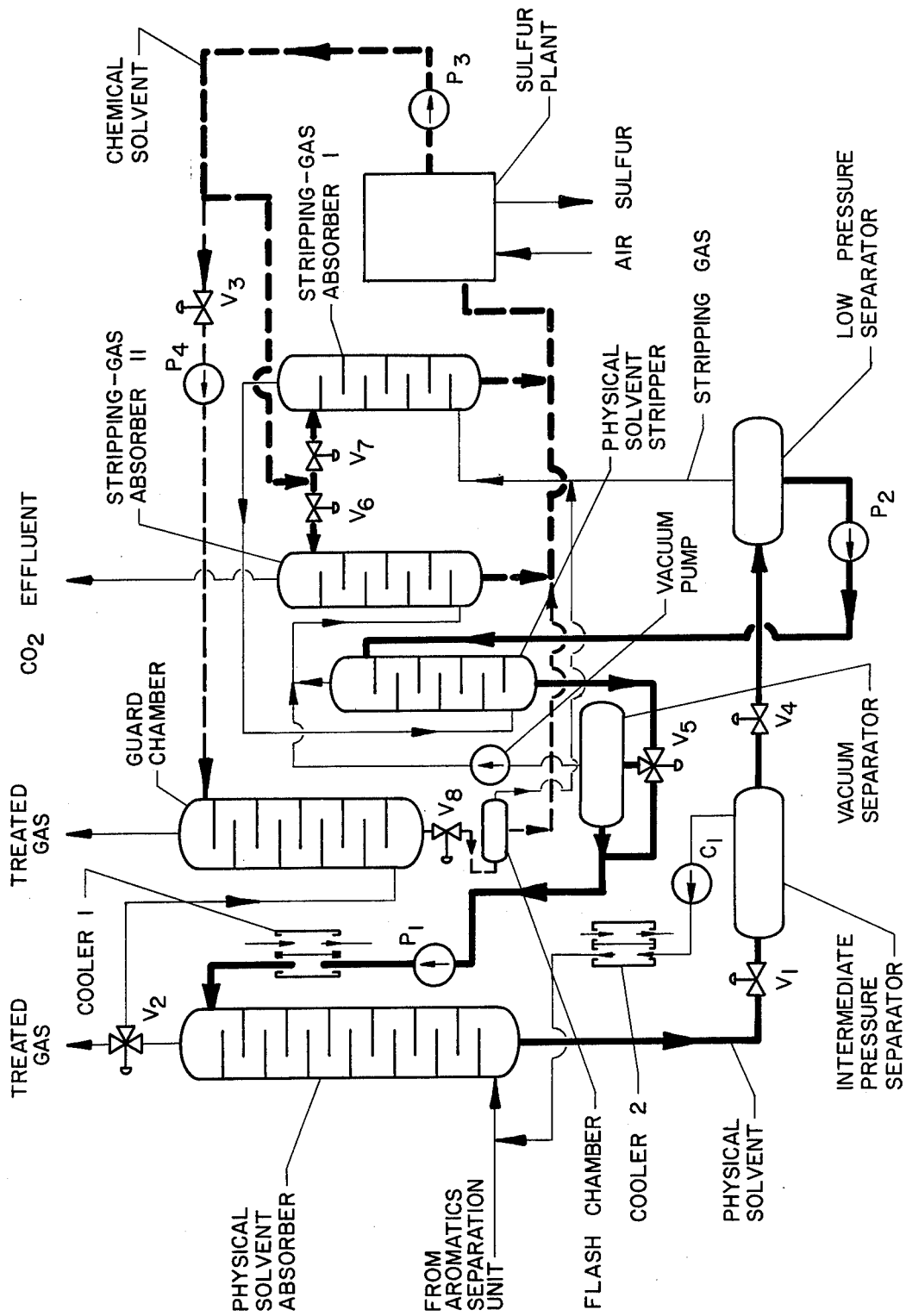

PROCESS FOR ACID GAS REMOVAL FROM GASEOUS MIXTURES

This invention is directed to high efficiency, environmentally desirable acid gas removal from gaseous mixtures. The process of this invention provides for removal of large amounts of $CO_2$ while effectively removing small amounts of $H_2S$ and trace amounts of COS and $CS_2$ from a gas stream. Production of substitute natural gas from coal and refinery gases present particular problems in acid gas removal where the incoming stream to the acid gas removal process is at approximately 1100 psia, 70° F., has a mole ration of $CO_2/H_2S$ of about 25 to 50 and a $CO_2$ content of about 15 to 40 mole percent. The acid gas removal process must reduce the sulfur in the product stream to less than 1 ppm so as not to poison the catalyst in the methanation step which follows and the $CO_2$ in the product stream to less than 3 percent by volume to provide pipeline-quality gas. Also, to minimize the environmental impact of plants producing substitute natural gas from coal, the $CO_2$ effluent to the atmosphere must contain less than 7 ppm sulfur. Also, it is desired that sulfur produced for utilization by the system be relatively free of hydrocarbons. Thus, it is seen that several factors must be considered with respect to acid gas removal from gaseous streams including the types of impurities to be removed from the gas stream, the concentration levels of the impurities and the degree of removal necessary, the selectivity required between the various acid gases and between the acid gases to be removed and the product stream, the volume and temperature-pressure conditions of the gas stream input, and the allowable levels of acid gas constituents in both the product stream and the plant effluent stream. The input stream from coal gasification may be at about 70° F. and 1100 psia containing about 15 to 40 mole percent $CO_2$ with a molar $CO_2/H_2S$ ratio of 25 to 50 while the product stream should contain less than 1 ppm S and less than 3 mole percent $CO_2$ and due to environmental considerations the overall plant effluent stream, which is exhausted to the atmosphere, should contain less than 7 ppm sulfur.

Presently available processes for acid gas removal from a gaseous stream may be classified as those involving chemical reaction and those involving physical absorption with no chemical reaction. $CO_2$ and $H_2S$ are presently removed from natural and $NH_3$ synthesis gas mixtures by chemical reaction with alkaline salt solutions of weak inorganic acid as taught by U.S. Pat. No. 3,563,695 or with alkaline solutions of organic acids or bases as taught by U.S. Pat. No. 2,177,068. Such chemical reaction processes depend substantially on stoichiometry, are relatively independent of pressure and are suitable for treatment of gases with lower concentrations of $CO_2$ to a high degree of purity or to purify gases available at relatively low pressures. The chemical processes do not afford the capacity necessary to remove the large mole percentages of $CO_2$ present as a result of coal gasification. The regeneration of such chemical solvents requires large circulation rates and energy input requirements, such as steam.

The physical processes for removing acid components from gaseous streams are preferred when the input stream is at a high pressure, above about 200 psi, and contains large amounts of acid constituents. However, the physical absorption of the gas components is dependent upon the coefficient of absorption for each gaseous component which is dependent on pressure and temperature. Low temperature physical absorption processes utilizing methanol, as exemplified by U.S. Pat. No. 2,863,527, do attack the problem of acid gas removal from inputs of the compositions dealt with by the present invention. Such processes utilizing methanol require low temperature operation of less than 0° C., preferably less than −30° C. Thus, the energy input requirements for cooling are high and the process exhibits greater than desired methane and ethane absorption thereby necessitating large energy inputs for recompression and recovery. Other physical absorption processes may be operated at ambient or higher temperatures, such as those utilizing propylene carbonates as taught by U.S. Pat. No. 2,926,751 and those using N-methylpyrrolidone or glycol ethers as taught by U.S. Pat. No. 3,505,784 have disadvantages and poor selectivity for $H_2S$ over $CO_2$ and undesired absorption of higher hydrocarbons. U.S. Pat. No. 2,649,166 teaches physical solvents for absorption of $CO_2$ from gases by use of ethers of polyglycols and specifically dimethoxytetraethylene glycol. This process is known as the Selexol Process and has serious disadvantages for use with feed gases as used in the present invention due to poor selectivity for $H_2S$ and undesired absorption of higher hydrocarbons.

U.S. Pat. No. 3,773,896 suggests the use of an N-substituted morpholine for physical absorption of acidic compounds from a gas stream. When applied to conditions of the feed stream as set forth above for the present invention together with the product stream and atmospheric effluent stream requirements, the process taught by the U.S. Pat. No. 3,773,896 patent cannot result in the degree of regeneration of physical solvent with respect to $CO_2$ and $H_2S$ required to produce the desired levels as set forth in the present invention.

It is an object of this invention to provide a process for acid gas removal from gaseous mixtures which overcomes the above disadvantages.

It is a further object of this process to provide acid gas removal from the gas stream obtained by coal gasification resulting in a product stream of pipeline-quality gas and a plant atmospheric discharge stream meeting environmental requirements.

It is yet another object of this invention to provide an energy conserving process for acid gas removal from the product of coal gasification.

It is still another object of this invention to provide a process which removes $H_2S$ from acid gas streams to provide economical sulfur production.

It is an object of this invention to provide an acid gas removal process capable of processing a gas input of 15 to 40 mole percent $CO_2$ wherein the molar ratio of $CO_2$ over $H_2S$ is 25 to 50 to a product stream containing less than 1 ppm sulfur and less than 3 volume percent $CO_2$ while not removing substantial amounts of desired methane and ethane and producing an overall plant atmospheric effluent stream of less than 7 ppm sulfur.

It is another object of this invention to provide a hybrid combination physical-chemical absorbent process for removal of gaseous acidic components from a gas stream.

These and other objects which will become apparent upon reading of the description and in the drawing showing a preferred embodiment wherein:

The FIGURE shows a schematic plant layout according to one embodiment of the process of this invention.

The process of this invention is suitable for removal of acid gas constituents from various gaseous mixtures such as coke oven gas, producer gas, natural gas and is especially suitable for use in the production of substitute natural gas from coal or lignite. There are various processes for the production of gas from coal such as taught by U.S. Pat. No. 3,347,647 and 3,708,269.

The process of this invention is suitable for installation following any coal gasification process after shift and removal of aromatic compounds from the coal gasification product stream and prior to methanation. It is desired to separate the higher boiling substituents from the gas stream prior to treatment by the process of this invention. In the case of coal gasification, the process of this invention is performed after shift and aromatics separation. The aromatics separation may be effected by various methods known in the art such as condensation in the presence of a polar organic washing liquid. The polar organic washing liquid used in the aromatics separation may preferably be the same chemical as the physical solvent used in the process of this invention. Accordingly, there may be some interrelation between the process scheme of this invention with the prior separation of the aromatics. However, the process of this invention will be treated separate with the input gas stream being the output gas stream from the aromatics separation unit. A preferred chemical for use as a physical solvent in the process of this invention which is suitable also for use in the aromatics separation unit is N-formylmorpholine.

The composition of a typical feed gas to the process of this invention is as follows:

| Component | Feed-Gas Composition, mol % |
|---|---|
| $CO_2$ | 29.4 |
| $C_2H_6$ | 0.5 |
| $CH_4$ | 14.9 |
| $CO$ | 12.9 |
| $H_2$ | 40.8 |
| $H_2S$ | 1.2 |
| Aromatics | 0.3 |

The product gas stream from the process of this invention must contain less than 3 mole percent $CO_2$ and less than 1 ppm by volume sulfur for satisfactory pipeline gas, and the maximum sulfur content of any atmospheric vented stream from the plant must be less than 7 ppm.

Referring to the FIGURE, the gaseous mixture from the aromatics separation unit is introduced to the bottom of the physical solvent absorber. When the gas is the product of coal gasification the pressure in the physical solvent absorber may be at about 800 to 1200 psia and the temperature of the gaseous stream input to the physical solvent absorber at about 60° to 120° F. Any configuration of gas-liquid contact chamber is suitable, desirably one exhibiting a low pressure drop and high volume flow through such chamber. It is preferred that the physical solvent absorber be a vertical tray-type absorber as is well known in the art, the number of trays being governed by the required flow rates and gaseous contents. The gas being treated travels upward through the chamber while the physical solvent liquid passes downward through the chamber. The product gas is removed from the physical solvent absorber at the top and the physical solvent containing the removed gaseous impurities is drained from the bottom of the chamber for regeneration and recycle.

Any physical solvent which physically absorbs quantities of $CO_2$ and $H_2S$ from gaseous streams to result in the product stream containing less than 3 volume percent $CO_2$ and less than 1 ppm sulfur while having high rejection properties with respect to the hydrocarbons desired in pipeline-quality gas, under the operating temperature and pressures, is suitable. The physical solvent must also be liquid at the operating temperatures and pressure. A review of suitable physical solvents is set forth in chapter 5 of the book "Gas and Liquid Sweetening," Dr. R. N. Maddox, 2nd edition, published by Campbell Petroleum Series, Norman, Oklahoma, 1974. Physical absorption agents, or physical solvents, include a wide range of chemical classes including amides, ketones, acetates, esters, alcohols and ethers. These are basically all organic polar chemicals. Specific chemicals which are especially useful as physical solvents include propylene carbonate, glycerol triacetate, butoxy diethylene glycol acetate, methoxy triethylene glycol acetate, as used in the Fluor Solvent Process; dimethyl ether of polyethylene glycol as used in the Selexol Process; N-methyl-2 pyrrolidone as used in the Purisol Process; methanol as used in the Rectisol Process; tri-n-butylphosphate as used in the Estasolvan Process; methyl cyanoacetate, glutaronitrile, trimethylene cyanohydrin, N-methyl pyrrolidone, dimethyl formamide, diethylene glycol dimethyl ether, sulfolane, N-formylmorpholine, and N-formylpiperidine. We prefer to use N-formylmorpholine. Use of N-formylmorpholine with 1 to about 10 weight percent water is especially desired to permit lower operating temperatures in the physical solvent absorber. Especially preferred is a solvent mixture with about 95 percent N-formylmorpholine and 5 percent water. The above physical solvents may be used separately or in compatible mixtures. Up to about 10 weight percent aqueous solutions may be used.

To minimize the rate of physical solvent circulation, it is desirable to introduce the regenerated physical solvent into the top of the physical solvent absorber at as low a temperature as practical. The preferred physical solvent composition of this invention, 95 weight percent N-formylmorpholine and 5 weight percent water, allows that temperature to be about 10° to 50° F. lower than is possible using pure N-formylmorpholine as taught in U.S. Pat. No. 3,773,896. This is due to the relatively high temperature of crystallization of N-formylmorpholine. While use of the 5% aqueous solution of N-formylmorpholine decreases the absorption capacity for $CO_2$ and $H_2S$ as compared to pure N-formylmorpholine, we have found that this decrease in absorption capacity is not substantial in effecting the process of this invention. The following shows these effects:

| | N-formylmorpholine Anhydrous | 95% N-formylmorpholine 5% Water | |
|---|---|---|---|
| Crystallization Temperature, ° F. | 68 | 5 | |
| Absorption Coefficient* | 80° F. | 80° F. | 40° F. |
| $CO_2$ | 3.14 | 2.62 | 4.86 |
| $H_2S$ | 27.10 | 15.71 | 29.92 |

*Absorption Coefficient, volume of gas (60° F., 1 Atm.) absorbed per volume of solvent at 60° F. and 1 atmosphere pressure.

The treated gas output at the top of the physical solvent absorber chamber is at about the same pressure as the gaseous input to the chamber and approximately 30° F. cooler than the gaseous input to the chamber. The physical solvent absorber liquid bottoms output containing the physically absorbed $CO_2$ and $H_2S$ is passed through valve $V$, to an intermediate pressure separator.

The intermediate pressure separator reduces the pressure to about 250 to 450 psia, preferably about 375 psia, to release absorbed hydrocarbons which are recompressed to about 1000 to 1200 psia and returned to the physical solvent absorber. It is desired to cool the hydrocarbon gas stream to about the temperature of the gas from the aromatics separation unit for introduction into the physical solvent absorber. Compression of this stream is accomplished by compressor denoted C1 while cooling of the stream is accomplished by cooler 2 as shown in the figure.

The intermediate pressure separator liquid output containing the physically absorbed $CO_2$ and $H_2S$ is then passed through valve $V_4$ to a low pressure separator reducing the pressure to approximately atmospheric to produce stripping gas for use in stripping gas absorber 1. The low pressure separator vapor output contains nearly all of the $CO_2$ and most of the $H_2S$ physically absorbed by the physical solvent. Stripping gas absorber 1 removes $H_2S$ from the $CO_2$ stripping gas by use of an $H_2S$ selective chemical solvent to be discussed later.

The gaseous output from the stripping gas absorber 1, mainly $CO_2$ free of $H_2S$, is used as a stripping gas to remove $H_2S$ from the low pressure separator liquid output which is passed in countercurrent flow relationship in the physical solvent stripper. A portion of the liquid output of the physical solvent stripper controlled by valve $V_5$ may be passed through the vacuum separator reducing the pressure about 3 to 10 psia, below atmospheric pressure, by use of the vacuum pump, thereby further reducing the $CO_2$ content of the physical solvent stream to about 1 mole percent. The physical solvent stream from the physical solvent stripper and vacuum separator is compressed to about 800 to 1200 psia by pump P1, cooled to about 20° to 60° F., preferably about 40° F., for recycle introduction into the top of the physical solvent absorber. The high efficiency of the process of this invention is dependent upon the physical solvent absorber feed containing very low amounts of $H_2S$ and $CO_2$, preferably less than 5 ppm sulfur and less than 2 mole percent and preferably less than about 0.5 mole percent of the $CO_2$.

The process of this invention utilizes a chemical solvent in conjunction with the physical solvent cycle already discussed. It is seen that the chemical solvent cycle passes through stripping gas absorbers I and II for high efficiency removal of the sulfur containing compounds from the low pressure separator vapor output in the physical solvent cycle. Valves $V_6$ and $V_7$ control the flow of chemical solvent to the stripping gas absorbers to provide sufficient chemical to remove $H_2S$. The stripping gas absorbers separate the sulfur-containing compounds from the carbon dioxide stripping gas by $H_2S$ selective chemical absorption and provide the sulfur-containing chemicals to a suitable sulfur plant. The chemical solvent may be the liquid absorber used in liquid absorption-oxidation sulfur production processes. A general review of sulfur production processes is set forth in chapter 9 of the book "Gas and Liquid Sweetening" previously referred to. The Stretford A.D.A. method utilizing sodium carbonate alkaline solution as the chemical absorber is preferred. Any chemical absorber which has the capability of removing sulfur-containing compounds from the principally $CO_2$—$H_2S$ gas stream and supplying the sulfur-containing compounds to a sulfur plant are suitable. Several of the sulfur production processes use sodium carbonate in an alkali solution as a chemical absorber. The Stretford sodium carbonate and Stretford sulfur plant are preferred. Using the Stretford solvent in the process shown in the figure and two stripping gas absorbers, the $H_2S$ content in the $CO_2$ atmospheric effluent may be reduced to about 1 ppm. The Takahax Process also uses alkaline sodium carbonate as a chemical solvent and is suitable for sulfur production. The Giammarco-Vetrocoke Process using alkaline arsenites as a chemical solvent for $H_2S$ is suitable for sulfur production in the process of this invention. The thioarsenates, sodium or ammonium thioarsenate, as used in the Thylox Process are suitable for use as chemical solvents in this invention. Aqueous ammonia solutions as used in the Perox Process are suitable chemical solvents.

The hybrid physical-chemical absorption process of this invention utilizes $CO_2$ stripping gas from which a major portion of the $H_2S$ has been removed in stripping gas absorber I to levels of less than 1 ppm sulfur and passing the $CO_2$ stripping gas, free of $H_2S$, in countercurrent relationship to the liquid from the low pressure separator further reducing the $H_2S$ content in the low pressure separator liquid output thereby providing a recycle absorber physical solvent feed containing less that 5 ppm sulfur and very small quantities of $CO_2$ with input gas to the stripping gas absorber containing less than about 1.3 mole percent $H_2S$. Thus, the physical solvent used in the physical solvent absorber is highly efficient, having been freed of undesirable $CO_2$ and sulfur components by both the action of physical and chemical absorption processes. It is this hybrid interrelation of physical and chemical absorption by which the process of this invention achieves the high capacity and high efficiency removal of $CO_2$ and sulfur-containing compounds from input gases containing high molar ratios of $CO_2$ to $H_2S$ while containing 15 to 40 mole percent $CO_2$ in the input gas in instances where the output product stream must contain less than 1 ppm S and less than 3 mole percent $CO_2$ to provide suitable pipeline-quality gas and also the effluent stream of $CO_2$ must contain less than about 7 ppm S to provide ecologically acceptable plants.

The process of this invention may be alternatively utilized with a guard chamber as shown in the FIGURE to reduce the sulfur content of the treated gas of less than 1 ppm, down to the range of 0.1 ppm when necessary. As seen in the FIGURE, the treated gas removed from the top of the physical solvent absorber may, in part or in whole by adjustment of valve $V_2$, be introduced to the bottom of the guard chamber and passed countercurrent to chemical solvent liquid introduced at the upper portion of guard chamber and controlled by valve $V_3$. The chemical solvent containing chemically absorbed sulfur compounds is withdrawn from the bottom of the guard chamber, controlled by valve $V_8$ and recycled to the sulfur plant through the flash chamber as shown in the FIGURE to reduce the pressure to approximately atmospheric. The flash releases some $CO_2$ from liquid and the $CO_2$ may be provided to the stripping gas input of stripping gas absorber 1.

The intermediate pressure separator, low pressure separator, and vacuum separator, as shown in the FIGURE, may be vessels of suitable sizing for pressure differential separation of gaseous and liquid components as is well known in the art. While two pressure separators are shown in the FIGURE, any desired greater number may be used.

Physical solvent absorber, guard chamber, physical solvent stripper, stripping gas absorber 1 and stripping gas absorber 2 may be any type of vessel providing suitable pressure containment and countercurrent liquid-gas contact. Various methods of such countercurrent liquid-gas contact are known in the art. Preferred vessels are vertical chambers of suitable height to provide desired number of pans as shown schematically in the FIGURE, the number of pans being readily determined by one skilled in the art knowing the volume flows and absorption coefficients. While two stripping gas absorbers are shown in the FIGURE, any desired greater number may be used.

The pumps and compressors referred to in the drawing as P1, P2, P3 and P4, C1 and vacuum pump may be sized properly by one skilled in the art to provide suitable pressures and flow rates.

Cooler 1 and cooler 2 may be any type of cooling system to provide the necessary cooling to the streams in which they are located as discussed elsewhere in this description. Cooling from pressure reductions in the pressure separators may be used as part of the refrigerant requirements of the process.

The following Example is presented as an illustration of one embodiment of the process of this invention and is not intended to limit the invention.

temperature-pressure conditions set forth such as shown above.

The temperature-pressure conditions and major gaseous components of the streams are shown for the positions indicated which can be readily related to the FIGURE.

The treated gas output stream referred to in Table I is the treated gas output from the absorber and the guard chamber is not utilized, that is, valve V3 and valve V2 are closed to passage of materials to the guard chamber and the treated gas output is from valve V2. It is noted that the $CO_2$ in the treated gas output is about 1 molar percent and that the $H_2S$ concentration in the treated gas output is 1 ppm, both components well within the range of providing satisfactory pipeline-quality gas. Also, it is noted that $CH_4$ and $C_2H_6$ are not greatly removed from the treated gas output stream showing that the desired hydrocarbons in the pipeline-quality gas are desirably rejected by the absorption system. Further, the $H_2S$ concentration in the $CO_2$ effluent to the atmosphere is 1 ppm as sulfur which is environmentally acceptable.

EXAMPLE II

The same process as described in Example I is carried out with the addition of the guard chamber as shown in the FIGURE, that is, valve V2 and valve V3 are open to permit desired flow through the guard chamber. The treated gas output from the guard chamber is the same as set forth at Table I except that $H_2S$ is reduced to about 0.1 ppm as sulfur.

TABLE I

|  | From Aromatics Separation Unit | Treated Gas Output | Absorber Bottoms Output | Intermediate Pressure Separator Vapor Output | Intermediate Pressure Separator Liquid Output |
|---|---|---|---|---|---|
| Pressure, psia | 1100 | 1100 | 1100 | 1100 | 200 |
| Temperature, °F. | 70 | 40 | 74 | 76 | 60 |
| Components, mol/hr |  |  |  |  |  |
| CO | 3555.0 | 3555.0 | 43.5 | 43.5 | 0.0 |
| $CO_2$ | 8102.0 | 200.0 | 10164.6 | 2062.6 | 8102.0 |
| $H_2$ | 11243.0 | 11242.9 | 137.7 | 137.6 | 0.1 |
| $CH_4$ | 4106.0 | 4099.9 | 208.5 | 202.4 | 6.1 |
| $C_2H_6$ | 138.0 | 127.1 | 30.5 | 19.6 | 10.9 |
| $H_2S$ | 311.0 | 1 ppm(asS) | 322.9 | 11.9 | 311.0 |
| Solvent | 0.0 | 0.0 | 43106.2 | 0.0 | 43106.2 |
|  | 27455.0 | 19224.9 | 54013.9 | 2477.6 | 51536.3 |
|  | Low Pressure Separator Vapor Output | Low Pressure Separator Liquid Output | Vacuum Separator Vapor Output | Absorber Physical Solvent Feed | $CO_2$ Effluent |
| Pressure, psia | 14.7 | 14.7 | 4.5 | 1100 | 14.7 |
| Temperature, °F. | 40 | 40 | 40 | 40 | 70 |
| Components, mol/hr |  |  |  |  |  |
| CO | 0.0 | 0.0 | 0.0 | 0.0 | 0.0 |
| $CO_2$ | 7488.0 | 614.0 | 414.0 | 200.0 | 7902.0 |
| $H_2$ | 0.1 | 0.0 | 0.0 | 0.0 | 0.1 |
| $CH_4$ | 6.1 | 0.0 | 0.0 | 0.0 | 6.1 |
| $C_2H_6$ | 10.9 | 0.0 | 0.0 | 0.0 | 10.9 |
| $H_2S$ | 211.0 | 100.0 | 0.0 | 0.0 | 7 ppm (as S) |
| Solvent | 0.0 | 43106.2 | 0.0 | 43106.2 | 0.0 |
|  | 7716.1 | 43820.2 | 414.0 | 43306.2 | 7919.1 |

EXAMPLE I

The process as shown in the FIGURE is operated to treated an incoming stream of 250 million cubic feet per day to be processed from an aromatics separation unit at the pressure and temperature conditions and major components as shown in Table I. The material balances have been worked out based upon the experimental equilibrium values (K) for the major gaseous components in an aqueous solution of N-formylmorpholine (95% — 5% N-formylmorpholine — water) under the While in the foregoing specification this invention has been described in relation to certain preferred embodiments thereof, and many details have been set forth for purpose of illustration, it will be apparent to those skilled in the art that the invention is suseptible to additional embodiments and that certain of the details described herein can be varied considerably without departing from the basic principles of the invention.

We claim:

1. A hybrid physical-chemical absorbent process for removal of gaseous $CO_2$ and $H_2S$ from an acidic gas stream introduced at above about 200 psi and which has a mole ratio of $CO_2/H_2S$ of about 25 to 50 and $CO_2$ content of about 15 to 40 mole percent comprising:

absorbing $CO_2$ and $H_2S$ by passing a gas stream containing $CO_2$ and $H_2S$ in countercurrent flow to a liquid organic physical solvent in a physical solvent absorber, $CO_2$ being absorbed to a treated gas output level of less than 3 mole percent $CO_2$ and $H_2S$ to a treated gas output level of less than 1 ppm sulfur containing compound as sulfur;

regenerating said organic physical solvent for recycle in said physical solvent absorber by removing the $CO_2$-$H_2S$ gaseous mixture from the physical solvent principally by reduction of pressure, separating the $H_2S$ from the $CO_2$ by an $H_2S$ selective liquid chemical solvent, then passing the $CO_2$ in countercurrent flow in a physical solvent stripper to the physical solvent liquid obtained from said pressure reduction further removing $H_2S$ from said physical solvent recycle and returning the physical solvent containing less than 5 ppm sulfur in a sulfur containing compound and less than 2 mole percent $CO_2$ to said physical solvent absorber; and removing sulfur from said $CO_2$ gas stream from said physical solvent stripper by passing in countercurrent flow to said chemical solvent sufficient to provide $CO_2$ effluent to the atmosphere containing less than 7 ppm sulfur in a sulfur containing compound.

2. The process of claim 1 wherein said liquid physical solvent is selected from the group consisting of N-formylmorpholine, dimethoxy tetraethylene glycol as used in the Selexol Process, N-methyl-2-pyrrolidone as used in the Purisol Process, propylene carbonate and methyl cyanoacetate.

3. The process of claim 2 wherein said liquid physical solvent is N-formylmorpholine in about 1 to 10 weight percent water.

4. The process of claim 3 wherein said liquid physical solvent is a composition of about 95 weight percent N-formylmorpholine and about 5 weight percent water.

5. The process of claim 1 wherein said liquid chemical solvent is an $H_2S$ selective absorber selected from the group consisting of sodium carbonate as used in the Stretford Process, alkaline arsenites as used in the Giammarco-Vetrocoke Process, alkaline sodium and ammonium thioarsenate as used in the Thylox Process and an aqueous ammonia solution as used in the Perox Process.

6. The process of claim 1 wherein said liquid chemical solvent is sodium carbonate in an alkali solution.

7. The process of claim 1 wherein said acidic gas stream is the output of an aromatics separation unit following gasification of coal and has a pressure of about 800 to 1200 psia, a temperature of about 60° to 1200° F., a $CO_2$ content of 15 to 40 mole percent and a $CO_2/H_2S$ value of 25 to 50.

8. The process of claim 1 wherein said physical solvent contains less than about 0.5 mole percent $CO_2$ when recycled to said physical solvent absorber.

9. The process of claim 1 wherein said treated gas is further passed in countercurrent flow to said $H_2S$ selective liquid chemical solvent to reduce the sulfur content to the range of 0.1 ppm.

10. The process of claim 1 wherein the physical solvent output from the physical solvent stripper is passed through a vacuum separator reducing the pressure to about 3 to 10 psia.

11. The process of claim 1 wherein the pressure in the physical solvent absorber is about 800 to 1200 psia.

* * * * *